E. H. McCLELLAND.
HIGH PRESSURE LUBRICATING PUMP.
APPLICATION FILED JULY 6, 1915.

1,186,486.

Patented June 6, 1916.

Inventor.
Earby H. McClelland.
by Edward A. Krauss
Atty

UNITED STATES PATENT OFFICE.

EARBY H. McCLELLAND, OF TUCSON, ARIZONA, ASSIGNOR TO JOSEPH F. HEIMBACH, TRUSTEE, OF TUCSON, ARIZONA.

HIGH-PRESSURE LUBRICATING-PUMP.

1,186,486.      Specification of Letters Patent.      Patented June 6, 1916.

Application filed July 6, 1915. Serial No. 38,072.

*To all whom it may concern:*

Be it known that I, EARBY H. McCLELLAND, a citizen of the United States, residing at Tucson, in the county of Pima, State of Arizona, have invented new and useful Improvements in High-Pressure Lubricating-Pumps, of which the following is a specification.

This invention relates to high pressure lubricating pump constructions, and pertains especially to pumps adapted to feed lubricant to the cylinders of a locomotive engine.

It is the primary object of this invention to provide a pump which will feed fluid to a chamber which is under high pressure and a high temperature.

It is another object of this invention to provide a lubricator pump construction with double feeding and an emergency lubricator cup attachment.

It has been found that locomotive cylinders, especially those using superheated steam, are difficult to lubricate when the locomotive is handling a heavy load, such as drawing a train up an incline, a case which is common in hilly or mountainous country.

It has been the practice to place a lubricant under boiler pressure and feed it downward from a point within the cab of a locomotive or adjacent thereto to the cylinders; the lubricant moving under the action of gravity.

My invention is designed to be connected to lubricator lines, and force the lubricant into the cylinders or other parts under high pressure.

The pump is a fluid pressure operated pump and can be connected to the exhaust from the motor side of an air compressor, the exhaust pressure fluid operating my pump. The pump can also be operated by using an air pipe from the pump governor fittings and in various other ways.

Figure 1:
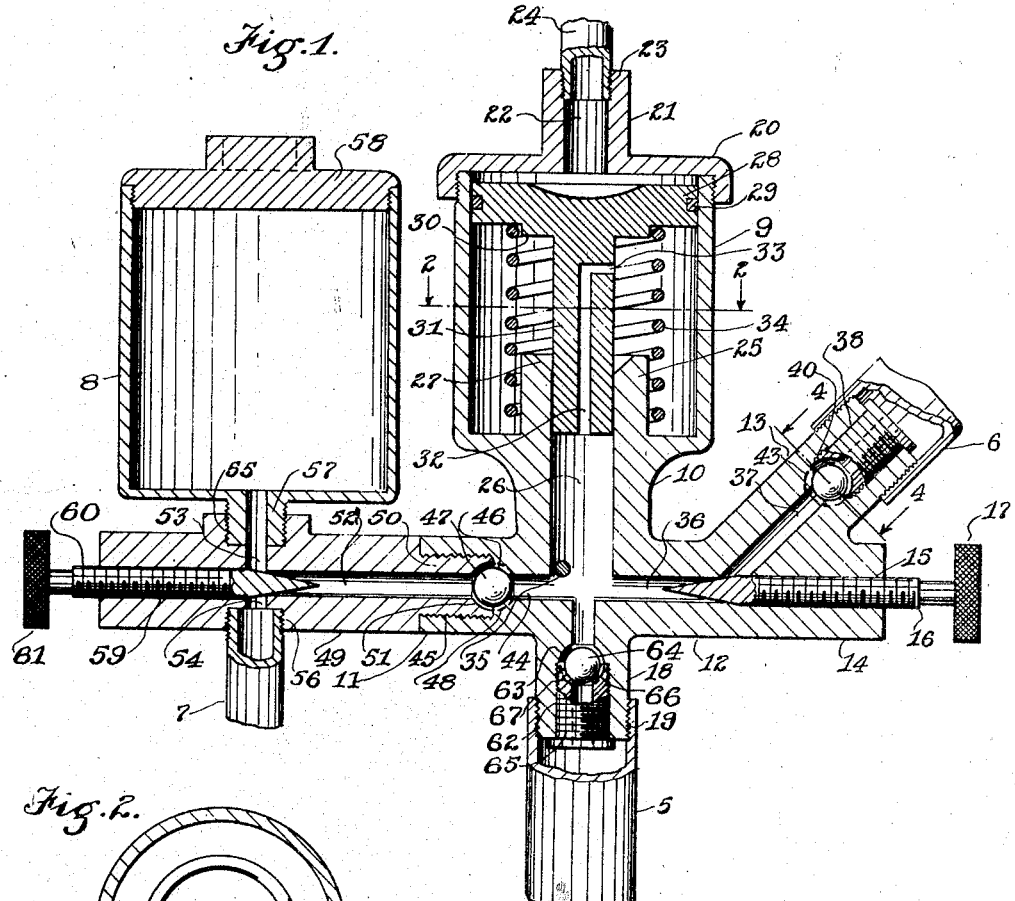
Figure 2:
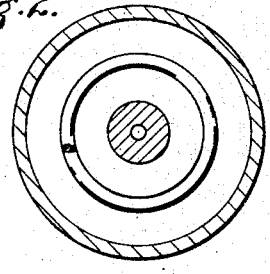
Figure 4:
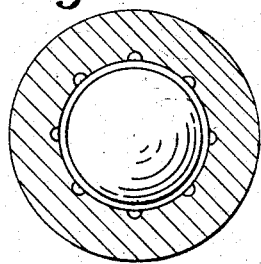
Figure 3:
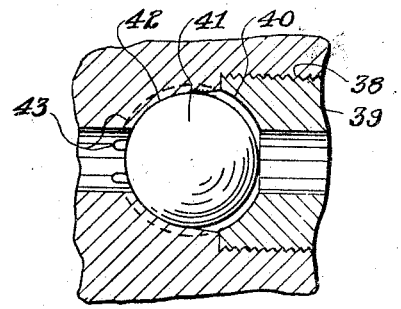

I accomplish the above objects by means of the embodiment of my invention illustrated in the accompanying drawing, in which:

Figure 1 is a vertical sectional view showing my improved pump, the lubricating cup and connections to the oil lines and to the member to which lubricant is to be fed. Fig. 2 is a horizontal section on the line 2—2 of Fig. 1. Fig. 3 is an enlarged vertical section of an inlet valve unit. Fig. 4 is a section taken on the line 4—4 of Fig. 1.

More specifically, 5 indicates generally the conduit through which the lubricant is to be discharged, but this conduit may be the ordinary tallow cup port in a locomotive valve chest.

6 is the oil line leading from the lubricator which may be of any of the usual types for locomotives.

7 is the conduit connected to an emergency oil line, and 8 a closed lubricant cup adapted to contain a combination of graphite and oil.

The motor cylinder for my pump is indicated by 9 and has a portion 10 reduced in diameter provided with arms 11 and 12 for the admission of lubricant to the trap well or pump cylinder in which pressure is placed upon the lubricant by my pump. The arm 12 is of bifurcated form having one member 13 provided with threads to which the oil line conduit is adapted to be connected. The other member 14 has a bore 15 interiorly threaded and adapted to engage the threads on a needle valve 16 which is provided with a knurled head 17 for convenient operation.

An extension 18 of the member 10 is exteriorly threaded as indicated at 19 for being engaged with threads on the conduit 5 or for being engaged in the port for the tallow cup. A cylinder head 20 for the motor end of my pump is provided with a nipple 21 having a bore 22 and provided with threads 23 for engagement with threads on the end of a conduit 24 which leads to the exhaust of the motor end of an air compressor or any other convenient device for operation of the pump. An upstanding flange 25 is provided in the lower end of the motor cylinder 9 and its interior forms an extension of the pump cylinder bore 26. The latter is of relatively small diameter as compared with the bore of the motor cylinder.

I have also shown the upper interior end of the bore 26 beveled as indicated at 27 to prevent jamming of the motor piston 28 when it strikes the upper end of flange 25. Piston 28 is provided with the usual packing 29, has a boss 30 and the pump plunger 31 preferably integral with each other. In the pump plunger 31 is an axially extending bore 32 which opens at the side to the motor cylinder and connects it and the pump cylinder, as indicated at 33. A spring 34 for turning the piston is disposed in contact with the piston 28 and the lower head of the motor cylinder. Within the pump cylinder I have placed a pin 35 which extends transverse to the axis of the bore and is disposed immediately above the inlet feed ports. This pin is to prevent the obstruction of the inlet ports if the plunger 31 breaks from the piston 28 and drops.

The arm 12 is provided with an inlet port 36 which connects with the inlet port 37 in the member 13. Inlet port 37 is counterbored at the upper end and threaded as at 38 for receiving a bushing 39. Bushing 39 has a seat 40 to receive a ball valve 41, providing a tight fit and preventing the outflow of lubricant upon the increase of pressure in the pump cylinder over that in the oil line. The lower end of the counterbore 38 is formed with a seat 42 for the ball 41, but this seat is grooved so that as the ball rests upon seat 42 the grooves 43 permit lubricant to flow into the cylinder of the pump. The amount of fluid flowing may be regulated by the needle valve 16. Arm 11 has an inlet 44 which is counterbored and threaded as indicated at 45. The inner end of the counterbore is provided with a valve seat 46 for valve 47 and is grooved as indicated at 48 to prevent a tight joint being made when the valve 47 seats against seat 46.

An extension member 49 provided with a reduced portion 50 exteriorly threaded is engaged with the threads in the counterbore 45. This extension is provided with a seat 51 for the ball valve 47 so that as the ball valve 47 seats upon seat 51 a tight joint will be made preventing the outflow of lubricant from the pump cylinder.

The axially extending bolt 49 is provided with laterally extending ports 53 and 54, each of which is counterbored as indicated at 55 and 56. The counterbore 55 receives the nipple 57 of the lubricant cup 8; the latter being provided with a closed top 58 which is secured in place by threads. The emergency oil line conduit 7 is secured in the counterbore 56. Port 52 is extended to the end of extension member 49 and is provided with threads as indicated at 59 for the reception of a needle valve 60 which is provided with a knurled head 61 for convenient operation.

The extension 18 is provided with a counterbored portion 62 which is interiorly threaded and has at its inner end a seat 63 adapted to be engaged by the valve 64 and form a tight joint. A bushing 65 is threaded on the exterior and secured in bore 62, a seat 66 being formed at the upper end and grooved as indicated at 67 to permit lubricant to flow about the ball valve when it rests upon the seat 66.

A pump having been installed in a locomotive with conduit 6 forming an oil line, 7 an emergency oil line, lubricant cup 8 filled with lubricant, a conduit 24 connected to the exhaust side of the motor end of an air compressor and an extension 18 fitted into the part through which lubricant is to pass, the pump operation is as follows: Upon the exhaust from the air compressor the pressure acts upon the top of the piston 28 forcing it downward and with it plunger 31. Due to the difference in size of the motor piston and the pump plunger, the plunger strikes the oil in cylinder 26 as an impact blow producing a relatively high pressure. The valves 41 and 47 make tight joints preventing the outflow of lubricant through the ports which they control. Valve 64 remains open and lubricant is forced under high pressure to the parts to be lubricated. Upon the cessation of the exhaust, spring 34 returns the piston 28 and with it plunger 31. A vacuum being created below the piston 28 lubricant passes through the inlet ports 36 and 44, provided the needle valves 16 and 60 are open. Valve 64 seats forming a tight joint and preventing lubricant from flowing upward into the pump cylinder.

The port 32 provided in plunger 31 is of such length that the resistance to the flow of lubricant therethrough is relatively great and in the operation of the device none of it passes into pump cylinder 9. A vacuum is produced therein below piston 28 and thereby providing a relatively small back pressure against which the piston 28 must operate. With needle valves 16 and 60 opened, lubricant is fed from the lubricator line, the emergency lubricator and the lubricator cup. By closing valve 60 lubricant is fed only from the lubricant line. By closing valve 16 lubricant may be fed from both the lubricant cup and the emergency lubricant line.

It will be obvious that my lubricator pump construction provides a device which has a maximum of safety, since there are two lubricator lines for feeding besides a lubricant cup and that in case the pump goes out of operation lubricant will continue to flow by reason of the valve construction which normally freely connects the feed lines and the discharge. It will also be obvious that the application of my pump to lubrication is but one of the uses to which it may be put, as it can also be used in connection with boilers to graduate boiler compound into the boiler.

What I claim is:

1. A pump, comprising a motor cylinder of relatively large bore having a fluid pressure inlet, a pump cylinder disposed below said motor cylinder of relatively small bore, a piston disposed in said motor cylinder, a resilient member disposed below said piston for returning same, a plunger secured to said piston and disposed for reciprocation in said pump cylinder, an inlet for said pump cylinder disposed at the lower end thereof, a throttle valve controlling said inlet, a normally open check valve controlling said inlet, a second inlet for said pump cylinder disposed adjacent said first inlet, a normally open check valve for controlling said inlet, a conduit connected to said second inlet, a throttle valve controlling said second inlet, a lubricator cup secured to said second inlet, an emergency lubricator line secured to said second inlet, a discharge port connected to said pump cylinder and a normally open check valve controlling said discharge port.

2. A pump, comprising a motor cylinder of relatively large bore, having a fluid pressure inlet, a piston cylinder disposed below said motor cylinder of relatively small bore, a piston disposed in said motor cylinder, a resilient member disposed below said piston for returning the same, a plunger secured to said piston provided with a bore connecting the motor cylinder below the piston and the pump cylinder and disposed for reciprocation in said pump cylinder, an inlet for said pump cylinder disposed at the lower end thereof, a throttle valve controlling said inlet, a normally open check valve controlling said inlet, a second inlet for said pump cylinder disposed adjacent said first inlet, a normally open check valve for controlling said inlet, a conduit connected to said second inlet, a throttle valve controlling said second inlet, a lubricator cup secured to said second inlet, an emergency lubricator line secured to said second inlet, a discharge port connected to said pump cylinder and a normally open check valve controlling said discharge port.

3. A pump, comprising a motor cylinder, of relatively large bore, having a fluid pressure inlet, a pump cylinder disposed below said cylinder of relatively small bore, a piston disposed in said motor cylinder, a resilient member disposed below said piston for returning same, a plunger secured to said piston and disposed for reciprocation in said pump cylinder, an inlet for said pump cylinder disposed at the lower end thereof, a throttle valve controlling said inlet, a normally open check valve controlling said inlet, a second inlet for said pump cylinder disposed adjacent said first inlet, a normally open check valve for controlling said inlet, a conduit connected to said second inlet, a throttle valve controlling said second inlet, a lubricator cup secured to said second inlet, an emergency lubricator line secured to said second inlet, a discharge port connected to said pump cylinder, a normally open check valve controlling said discharge port, and a safety pin disposed in said pump cylinder transverse thereto and at a point immediately above said inlet and discharge ports.

4. A pump cylinder, comprising a motor cylinder of relatively large bore having a fluid pressure inlet, a pump cylinder disposed below said motor cylinder of relatively small bore, a piston disposed in said motor cylinder, a resilient member disposed below said piston for returning same, a plunger secured to said piston and disposed for reciprocation in said pump cylinder, an inlet for said pump cylinder disposed at the lower end thereof, a needle valve controlling said inlet, a normally open check valve controlling said inlet, a second inlet for said pump cylinder disposed adjacent said first inlet, a normally open check valve for controlling said inlet, a conduit connected to said second inlet, a needle valve controlling said second inlet, a lubricator cup secured to said second inlet, an emergency lubricator line secured to said second inlet, a discharge port connected to said pump cylinder and a normally open check valve controlling said discharge port.

5. A high pressure lubricating pump comprising a motor cylinder of relatively large bore having a fluid pressure inlet, a pump cylinder disposed below said motor of relatively small bore, a piston disposed in said motor cylinder, a resilient member disposed below said piston for returning the same, a plunger secured to said piston and reciprocably mounted in said pump cylinder, an oil inlet for said pump cylinder at the lower end thereof, a throttle valve controlling said inlet, a normally open check valve controlling said inlet, a second oil inlet for said pump cylinder, a normally open check valve for controlling said second inlet, a lubricator cup secured to said second inlet, a discharge port connected to said pump cylinder, and a normally open check valve controlling said discharge port.

In witness that I claim the foregoing I have hereunto subscribed my name this 25 day of June, 1915.

EARBY H. McCLELLAND.